US 6,557,082 B1

(12) United States Patent
Josten et al.

(10) Patent No.: US 6,557,082 B1
(45) Date of Patent: Apr. 29, 2003

(54) METHOD AND APPARATUS FOR ENSURING CACHE COHERENCY FOR SPAWNED DEPENDENT TRANSACTIONS IN A MULTI-SYSTEM ENVIRONMENT WITH SHARED DATA STORAGE DEVICES

(75) Inventors: Jeffrey William Josten, San Jose, CA (US); James Zu-Chia Teng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/539,664

(22) Filed: Mar. 30, 2000

(51) Int. Cl.$^7$ .................. G06F 13/00; G06F 12/00; G06F 17/30
(52) U.S. Cl. .................. 711/141; 711/142; 711/119; 707/201
(58) Field of Search ................. 711/141, 142, 711/119, 121, 124; 707/8, 201, 204

(56) References Cited

U.S. PATENT DOCUMENTS

| | | | |
|---|---|---|---|
| 5,333,310 A | | 7/1994 | Sakai .............................. 707/8 |
| 5,408,653 A | | 4/1995 | Josten et al. .................... 707/8 |
| 5,544,345 A | | 8/1996 | Carpenter et al. ........... 711/150 |
| 5,546,579 A | | 8/1996 | Josten et al. .................... 707/8 |
| 5,574,902 A | * | 11/1996 | Josten et al. .................... 707/1 |
| 5,692,182 A | * | 11/1997 | Desai et al. .................... 707/10 |
| 5,761,660 A | | 6/1998 | Josten et al. .................... 707/8 |
| 5,813,016 A | | 9/1998 | Sumimoto .................... 707/201 |
| 5,903,907 A | * | 5/1999 | Hagersten et al. ........... 711/122 |
| 5,933,593 A | * | 8/1999 | Arun et al. ...................... 714/6 |
| 6,064,805 A | * | 5/2000 | McCrory et al. ........... 709/227 |

OTHER PUBLICATIONS

Elmasri, et al., Fundamentals of Database Systems, 2000, pp. 631–633, 637–640 and 708.
"Cache Storage Reliability Method for Personal Computers," IBM Tech. Disc. Bull., vol. 37, No. 8, Aug. 1994, pp. 247–250.*
Franklin et al, "Transactional Client–Server Cache Consistency: Alternatives and Performance," ACM Transactions on Database Systems, vol. 22, No. 3, Sep. 1997, pp. 315–363.*

* cited by examiner

Primary Examiner—Glenn Gossage
(74) Attorney, Agent, or Firm—Pretty, Schroeder & Poplawski, PC

(57) ABSTRACT

A method, apparatus and article of manufacture for ensuring cache coherency in a database containing a data store on a central data storage device connected to a plurality of computers. When an immediate write option is set, the data in a local buffer pool changed by a first transaction on a first computer is immediately written to a group buffer pool at the central data storage device, prior to initiating a second transaction upon a second computer that relies upon the modified data. Local buffer pools are then invalidated thereby facilitating local buffer pool updates from the group buffer pool. The immediate write (IW) option may be a subsystem parameter set at a system level or a bind option set at a plan level. The immediate write option may be set so that data is written to the group buffer pool at or before a phase one commit.

39 Claims, 4 Drawing Sheets

METHOD AND APPARATUS FOR ENSURING CACHE COHERENCY FOR SPAWNED DEPENDENT TRANSACTIONS IN A MULTI-SYSTEM ENVIRONMENT WITH SHARED DATA STORAGE DEVICES

BACKGROUND OF THE INVENTION

1. Field of the Invention

This invention relates in general to computer-implemented database systems, and, in articular, to a technique for ensuring cache coherency for spawned dependent transactions in multi-system environment with shared data storage devices.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. The tables are typically stored on direct access storage devices (DASD), such as magnetic or optical disk drives for semi-permanent storage.

In a DBMS, data records are stored in table spaces. A table space may contain one or more tables. Each table space contains a number of space map pages. Each space map page covers a number of data pages. One or more records can be stored in a single data page. All data pages within a single table space must have the same page size. Typically, a page contains 4096 bytes.

In a multi-system environment with shared data storage devices, multiple computers are connected by a network to each other and to shared data storage devices (e.g., disks). In this system, the independently operating computers use storage consisting of one or more direct access storage devices (DASD's). Each computer system includes a database management system (DBMS) which provides access to databases stored on the DASD-oriented external storage subsystem. Additionally, each computer may share a cache in the form of a high-speed, frequently accessed shared electronic store (SES). When a SES is used, a computer will retrieve data from a DASD, process the data, and copy the data to the SES. Therefore, the SES may have a version of data that is more recent than the version stored on the DASD subsystem.

Additionally, each computer has storage consisting of a local buffer pool. In this context, each DBMS possesses and maintains, in its own internal storage, a local buffer pool to which data is fetched for access by one or more locally-executing applications. Each DBMS further includes a buffer manager (BM) for allocating buffer space and for controlling references to it. The buffer manager has access to tables, lists, and other structures containing information about the buffer. The buffer manager coordinates the movement of these structures between its buffer and external storage via the SES and/or DASD.

A DBMS obtains data and places it in its local buffer in response to transactional activity generated by applications executing on the DBMS's processor. Such applications generate read and write operations which, in turn, utilize the local buffer for access to the data. Furthermore, in the multi-system transaction environment, locking may be used by the computers to gain exclusive access to the data.

In a multi-system environment with shared data storage devices containing what will be referred to as "original" shared data, if there are two DBMS images called DB2A and DB2B that are sharing data, each will have a copy of the original shared data in a local buffer pool (e.g., a local cache). One could be modifying its copy of the shared data in its local buffer pool. This may lead to one of the DBMS images working with a version of the shared data in its local buffer pool that does not contain the modifications made by the other DBMS image in its own local buffer pool. In cases in which a DBMS image is dependent on the data modified by another DBMS, this could lead to problems.

For example, assume that there is a transaction, Transaction-1, that runs on DB2A and that makes an update to page P1 in DB2A's local buffer pool. Now, before Transaction-1 commits, it spawns a second transaction, Transaction-2, that is dependent on the update to P1 that was made by Transaction-1. For example, Transaction-1 may insert a record into a table as a way of passing information (e.g., parameters) to Transaction-2. In this scenario, Transaction-2 is called the "spawned dependent transaction," and Transaction-1 is called the "originating transaction." If Transaction-2 runs on the same DBMS image as Transaction-1, then Transaction-2 and Transaction-1 share access to the same local buffer pool memory, and thus Transaction-2 can "see" Transaction-1's still-uncommitted changes to Transaction-1.

When Transaction-2 sees the qualifying row on page P1, Transaction-2 requests a lock on the row or page which causes Transaction-2 to wait for Transaction-1 to commit, and then Transaction-2 gets the lock and sees the committed update from Transaction-1. However, if Transaction-2 runs on a different DBMS image than Transaction-1, then Transaction-2 and Transaction-1 do not share access to the same local buffer pool (DB2A and DB2B each have their own local buffer pool storage), and, therefore, Transaction-2 may see a down-level (i.e., local or downloaded from a shared data storage device) copy of page P1 that does not yet reflect Transaction-1's still-uncommitted update to P1. That is, Transaction-2 has a "stale" copy of data (i.e., data that does not include updates made by Transaction-1) in its local buffer pool. So when Transaction-2 evaluates the rows in DB2B's down-level copy of P1, Transaction-2 may not see Transaction-1's still-uncommitted update to P1, and, therefore, may not find the qualifying row from Transaction-1. So Transaction-2 gets a "record not found" return code instead of finding the row and waiting for Transaction-1 to commit.

Therefore, there is a need in the art for an efficient technique for ensuring cache coherency for spawned dependent transactions in a multi-system environment with shared data storage devices.

SUMMARY OF THE INVENTION

To overcome the limitations in the prior art described above, and to overcome other limitations that will become apparent upon reading and understanding the present specification, the present invention discloses a method, apparatus, and article of manufacture for a computer-implemented technique for ensuring cache coherency for spawned dependent transactions in a multi-system environment with shared data storage devices.

In accordance with the present invention, a cache coherency system ensures cache coherency in a database containing data stored on a data storage device connected to a plurality of computers. At a first computer, a first transaction updates data in a local buffer pool. When an immediate write option is set, the data in the local buffer pool of the first computer is immediately written to a group buffer pool at a central system. Then, a local buffer pool invalidation signal is transmitted to each local buffer pool that is sharing the data in the group buffer pool. Additionally, the first computer spawns a second transaction at a second computer that is dependent on the updates to the data that were made by the first transaction. At the second computer, the local buffer pool invalidation signal is received, the local buffer pool is invalidated, and, prior to accessing the local buffer pool, the updated data is copied from the group buffer pool to the local buffer pool.

BRIEF DESCRIPTION OF THE DRAWINGS

Referring now to the drawings in which like reference numbers represent corresponding parts throughout.

DETAILED DESCRIPTION

In the following description of one embodiment of the invention, reference is made to the accompanying drawings which form a part hereof, and which show by way of illustration a specific embodiment in which the invention may be practiced. It is to be understood that other embodiments may be utilized as structural changes may be made without departing from the scope of the present invention.

Hardware Environment

Figure 1:
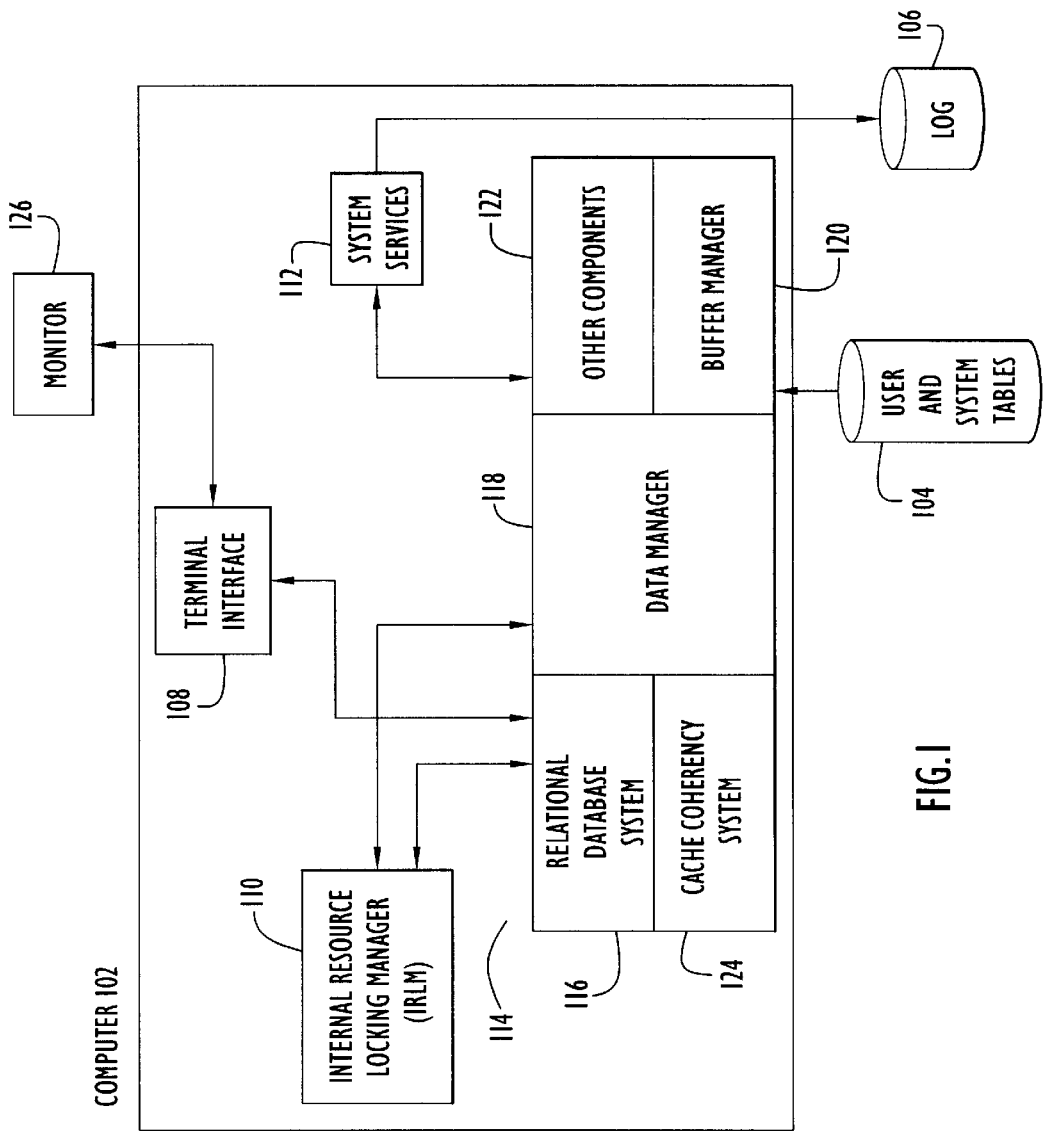
FIG. 1 illustrates an exemplary computer hardware environment used in accordance with an embodiment of the present invention.

FIG. 1 illustrates an exemplary computer hardware environment used in accordance with an embodiment of the present invention. In the exemplary environment, a computer system 102 is comprised of one or more processors connected to one or more data storage devices 104 and 106, such as a fixed or hard disk drive, a floppy disk drive, a Compact Disc Read Only Memory (CDROM) drive, a tape drive, or other device, that store one or more relational databases.

Operators of the computer system 102 use a standard operator or terminal interface 108 to transmit electrical signals to and from the computer system 102 that represent commands for performing various search and retrieval functions, termed queries, against the databases. In one representative embodiment of the invention, these queries conform to the Structured Query Language (SQL) standard, and invoke functions performed by a data management component that supports transactions, such as Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COMMON BUSINESS-ORIENTED LANGUAGE (COBOL). SQL allows the user to manipulate the data.

In one representative embodiment of the present invention, a data management component that supports transactions comprises the DB2® product offered by International Business Machines (IBM) Corporation for the OS/390® operating systems. Those skilled in the art will recognize, however, that the present invention has application to any RDBMS software, whether or not the RDBMS software uses SQL.

As illustrated in FIG. 1, the DB2® system for the OS/390® operating system includes three major components: the Internal Resource Lock Manager (IRLM) 110, the Systems Services module 112, and the Database Services module 114. The IRLM 110 handles locking services for the DB2® system, which treats data as a shared resource, thereby allowing any number of users to access the same data simultaneously. Thus concurrency control is required to isolate users and to maintain data integrity. The Systems Services module 112 controls the overall DB2® execution environment, including managing log data sets stored on data storage devices 106, gathering statistics, handling startup and shutdown, and providing management support.

At the center of the DB2 system is the Database Services module 114. The Database Services module 114 contains several submodules, including the Relational Database System (RDS) 116, the Data Manager 118, the Buffer Manager 120, the Cache Coherency System 124, and other components 122 such as an SQL compiler/interpreter. These submodules support the functions of the SQL language, i.e. definition, access control, interpretation, compilation, database retrieval, and update of user and system data. The Cache Coherency System 124 works in conjunction with the other submodules to rebalance partitioned data.

The present invention is generally implemented using SQL statements executed under the control of the Database Services module 114. The Database Services module 114 retrieves or receives the SQL statements, wherein the SQL statements are generally stored in a text file on the data storage devices 104 and 106 or are interactively entered into the computer system 102 by an operator sitting at a monitor 126 via operator or terminal interface 108. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104 and 106. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 and 106 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Data Sharing Overview

Figure 2:
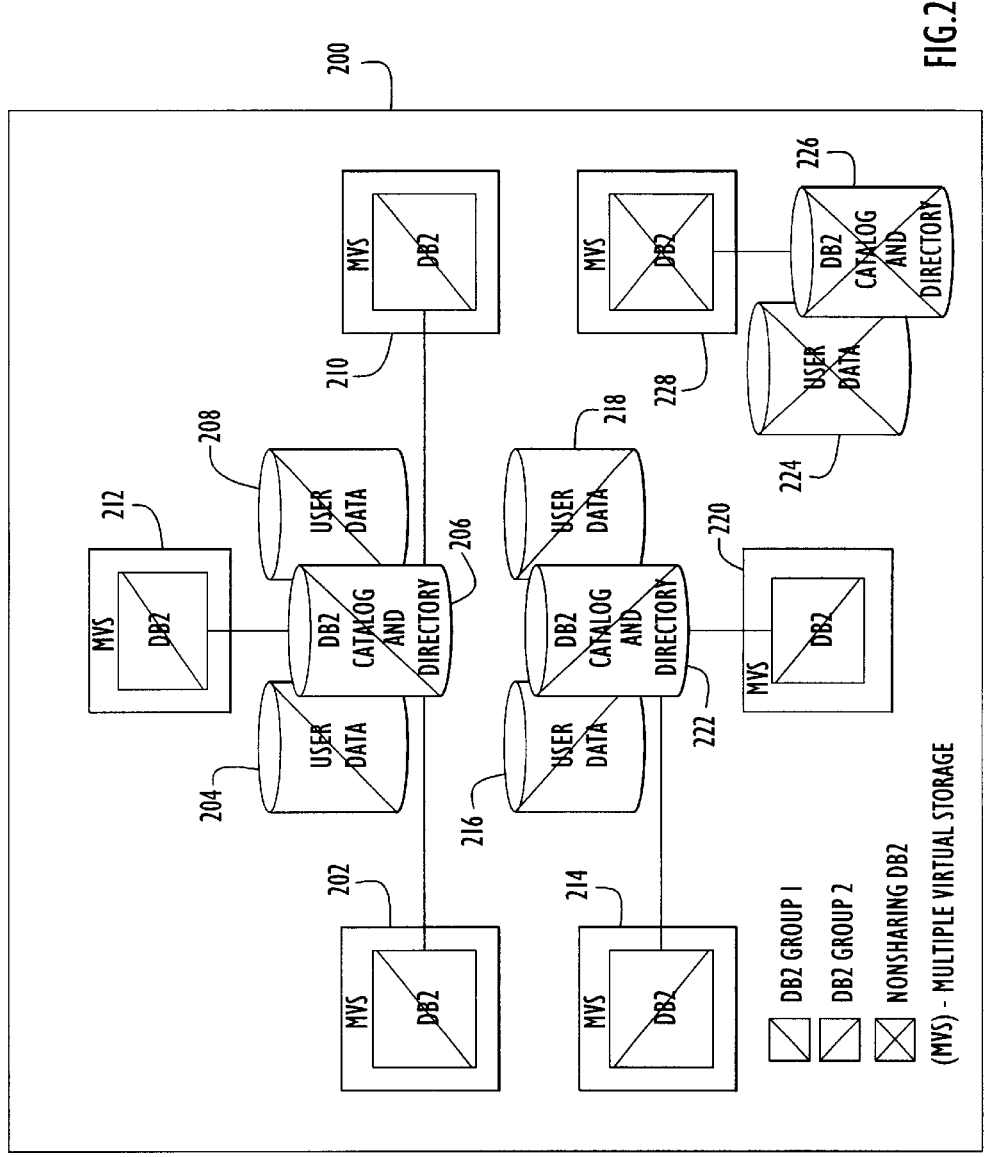
FIG. 2 is a block diagram illustrating an N-way multi-system transaction environment used in accordance with an embodiment of the present invention.

FIG. 2 is a block diagram illustrating an N-way multi-system transaction environment 200 used in accordance with an embodiment of the present invention. The multi-system transaction environment 200 provides database applications with full read and write concurrent access to databases, on shared direct access storage devices (DASDs), between DB2 subsystems that are within a data sharing group. For example, DB2 subsystems 202, 210, and 212 are in a data sharing group and share data on databases 204, 206, and 208. Similarly, DB2 subsystems 214 and 220 are in a DB2 data sharing group and share databases 216, 218, and 222. The DB2 subsystems may reside on the same or on different data storage devices. A DBMS instance resides on each DB2 subsystem. A DB2 subsystem that does not share data is a nonsharing DB2. For example DB2 subsystem 228 does not share data from databases 224 and 226.

A transaction accesses data belonging to a data sharing group from within a single member (i.e., DB2 subsystem) of the group. Applications and transactions are unaware that data sharing is taking place within the data sharing group and do not know whether the data they are accessing is being actively shared. All of the multi-system concurrency and buffer coherency issues are automatically managed, which are transparent to the applications and transactions.

Actual sharing of data is controlled by workload scheduling, DASD connectivity, and authorization. The multi-system concurrency and coherency controls are activated only when data is actually shared between DB2 systems within a data sharing group. Data access concurrency is supported at every level that is normally supported by DB2 (e.g., table space, table, page, or row). Additionally, the shared storage could be disk or shared electronic storage ("SES", such as the OS/390 coupling facility).

When there are multiple DBMS instances, all with equal access to the shared databases, a single page may be cached in multiple DBMS buffer pools, with each buffer pool being associated with a different instance. For DB2, the page size is equal to the block size, and a block is a unit read from or written to a data storage device, such as disk. The page locking protocol to read or write a page is to acquire a share (S) lock to read the page and acquire an exclusive (X) lock to update the page. This protocol implies that there can be multiple readers or a single updater of the page within a data sharing group.

To provide transactional semantics, the exclusive locks that are obtained on updated pages are held until the transaction reaches a point of consistency (i.e., until the transaction either commits or rolls back). Transactions hold exclusive locks on the updated pages to prevent other transactions in the same DBMS instance or the other sharing DBMS instances from updating or referencing those same pages. With page-level locking, because of the global locking mechanism, the intersystem buffer coherency is not a problem, as long as the transaction locks remain held. As soon as the transaction reaches a point of consistency and releases its exclusive locks on the pages that it has updated, a different transaction that is executing on a second DBMS instance can obtain the locks on those same pages and can manipulate them in the local buffer pool of its corresponding DBMS instance. If proper controls are not in place, the cache coherency problem can be readily visualized—a down-level version of the page (i.e., a version of the page that does not reflect the latest committed updates to the data) might be read into the local buffer pool from external storage (e.g., disk) or previously cached in the local buffer pool of the second DBMS instance and used as-is.

To prevent these problems, intersystem cache coherency protocols are followed. DB2 data sharing does this by using a force-at-commit policy for updated database pages. Force-at-commit implies that the updated page is written to external storage so that other DB2 members can read the latest version and the current down-level versions of the page that are cached in other DBMS instance buffer pools are cross-invalidated ("XIed").

In the other DB2 members, any subsequent access to the XIed buffer pool page detects the invalid condition of the page and refreshes the current version of the page from external storage.

P-locks are acquired by a buffer manger for a DB2 member on a page set to declare the physical read or write interest of a DB2 member in the page set. The physical read or write interest reflects the actual physical access characteristics of the transactions that are running on that DB2 member. When dealing with buffer coherency issues, the cache coherency system 124 (FIG. 1) is concerned with the actual physical read or update operations against the data. Thus, the DB2 data sharing buffer coherency protocols are controlled by P-locks. The purpose of P-locks is to ensure that the proper cache coherency protocols are used in a multi-system environment. P-locks are owned by the DB2 member.

P-locks are negotiable. That is, if one of the DB2 members changes the state of its P-lock on a resource (e.g., page set or partition) due to a change in the physical access characteristics on the resource (e.g., the DB2 member is going from read only ("RO") to read/write ("R/W") physical interest on a page set), the other DB2 members that hold a P-lock on that resource will be notified of this change in the inter-DB2 interest on the P-lock. Then, each DB2 member can then dynamically make any necessary adjustments in the cache coherency processing for the resource and downgrade or upgrade its P-lock state (negotiate the P-lock) accordingly. The P-lock negotiation process allows DB2 members to react dynamically to the changes of inter-DB2 interest and to enact intersystem buffer coherency protocols only when there is actual physical inter-DB2 R/W sharing of a page set.

For DB2, the page size is the same as the block size, and a block is a unit of disk that is read or written. Therefore, when page-level transaction locking is in effect with DB2 data sharing, DB2 can ensure that physical consistency of the pages is maintained, because the global page lock ensures that only one transaction process can update the page at a given time. However, when subpage concurrence, is allowed (e.g., row level locking on data pages), the global transaction lock is not held at the block level. Unless prevented, transactions running on different DB2 members could be allowed to update the same block or page at the same time, with one DB2 member possibly backing out the updates of another as the block gets written to external storage.

A latch is a memory-based serialization technique. That is, the control of which transaction holds the X latch or which transactions holds the S latch and which transactions are waiting for the latch on a given resource is accomplished by using compare and swap logic on a specific area in virtual memory associated with that resource (i.e., usually a control block). However, in a multi-system data sharing environment, because there are distributed memories (i.e., each DB2 member has its own virtual memory spaces), the memory-based latching technique no longer guarantees serialization across all the transactions. Thus, the scope of the page latch is expanded across all DB2 members to maintain the physical consistency of the page when subpage concurrency is allowed.

The cache coherency system uses a P-lock on the page as a global page latch. The page P-lock is owned by the DB2 member, and not by the transaction. Also, the page P-lock is negotiable. Because the P-lock is not owned by any transaction, the P-lock on a page can be released before or after the transactions that are updating the page reach a point of consistency. Therefore, using the page P-lock, different transactions running on two different DB2 members can obtain exclusive locks on different rows in the same page, and each transaction can update its exclusively locked row without requiring that the earlier transaction reaches a point of consistency.

Because the P-lock is system-owned and not transaction-owned, if a transaction needs to access a page in a manner that requires a P-lock on the page, the P-lock may already be held by that DB2 member due to a read or update to the page from a previous transaction on that DB2.

A Cache Coherency System

The present invention provides a cache coherency system 124 (FIG. 1). The cache coherency system 124 solves the problem of a second transaction working with "stale" data in its local buffer pool when spawned by a first transaction that modified the data. The cache coherency system 124 introduces a new "immediate write" (IW) option, which can be specified at the plan/package level or at the DBMS/system level. The plan/package level refers to the level of an access plan, which is generated by a DBMS to specify how data is to be retrieved in response to a request for data, or to the level of an application program. The DBMS/system level refers to the level of a member of the multi-system transaction environment described in FIG. 2.

If the IW option is activated, the cache coherency system 124 causes an updated transaction to immediately write a changed page to external, shared storage and to send local buffer pool invalidation signals. That is, as soon as a first transaction updates data in its local buffer pool, the updates are written to the shared data storage device. Additionally, the shared data storage device sends local buffer pool invalidation signals to each system sharing that data. A local buffer pool invalidation signal is a signal that indicates that a system should invalidate a particular page in its local buffer pool. Then, when the system tries to read data from its local buffer pool, the updated data in the shared data storage device is read into the local buffer pool.

In particular, the IW bind option controls when the cache coherency system 124 writes updated group buffer pool (GBP) dependent pages to a central system or coupling facility (or other shared data storage device, such as DASD for objects (or pages) set with a GBPCACHE NON-SYSTEM attribute). The cache coherency system 124 can either write the group buffer pool-dependent pages immediately, at or before phase 1 commit, or at or before phase 2 commit. The cache coherency system 124 writes the group buffer pool-dependent pages at buffer update time if a first transaction spawns a second, dependent transaction as soon as its update is completed (i.e., this is the immediate write yes option, IMMEDWRITE(YES)). The cache coherency system 124 writes the group buffer pool-dependent pages, at or before phase 1 commit, when a first transaction spawns a second, dependent transaction after phase 1 commit is completed, but before phase 2 commit has completed (i.e., this is the immediate write phase 1 commit option, IMMEDWRITE(PH1)). The cache coherency system 124 writes the group buffer pool-dependent pages, at or before phase 2 commit, as a default or if the first transaction does not spawn a second, dependent transaction (i.e., this is the default immediate write no option, IMMEDWRITE).

The IW bind option may be used to avoid "row not found" conditions for transactions that have ordered dependencies. For example, one transaction, called an originating transaction, updates shared data using INSERT, UPDATE, or DELETE, and then, before completing phase 2 of commit, spawns a second transaction that is dependent on the updates that were made by the first transaction. This type of relationship is referred to as "ordered dependencies" between transactions.

In some situations, the dependent transaction can encounter a "row not found" condition that would not occur in a non-data-sharing environment. The reason that the dependent transaction might start to encounter periodic "row not found" conditions after enabling data sharing is that in a data sharing environment the dependent transaction might run on a different DB2 member than the DB2 member on which the originating transaction is running. Additionally, there are multi-system buffering effects that are present in data sharing (each DB2 member has its own local buffer pools). The uncommitted buffered pages that are updated by the originating transaction are not immediately "visible" to the dependent transaction when it runs on a different DB2 member. Even in a non-data sharing environment, the dependent transaction would need to tolerate a "row not found" condition in cases where the originating transaction rolled back.

In one embodiment of the invention, if all of the following conditions are true, it is possible that the dependent transaction might periodically encounter a "row not found" condition when attempting to access a row that was updated by the originating transaction:

The originating transaction spawns the dependent transaction before its phase 2 of commit completes, and The dependent transaction runs on a different member than the originating transaction, and The dependent transaction is not bound with an isolation level of repeatable read, and The timing is such that the dependent transaction attempts to read the updated row before the originating transaction has completed phase 2 of the commit.

To prevent these periodic "row not found" situations, the following IW options may be used: IMMEDWRITE(PH1) or IMMEDWRITE(YES) option of BIND/REBIND for a plan or package that spawns dependent transactions that might run on other members. Additionally, the IMMEDWRI subsystem parameter may be used. DB2 immediately writes to the coupling facility any updated buffers that contain pages that belong to page sets or partitions that are dependent on group buffer pools.

In one embodiment of the invention, the cache coherency system 124 provides an additional subsystem parameter called IMMEDWRI. This subsystem parameter determines the IMMEDWRITE (IW) bind option used for plans and packages (at a plan/package level) that are run on a data sharing member. The following are the possible values of the IW option:

YES

The IMMEDWRITE(YES) option may be used for all plans and packages and indicates that immediate writes will occur before commit. In particular, the writes are performed as soon as the buffer update completes.

NO

The IMMEDWRITE bind option may be specified for any plan or package. The default is NO, indicating that conventional force-at-commit processing is used (i.e., the updated pages are written at or before phase 2 commit).

PH1

The IMMEDWRITE(PH1) option may be used for all plans and packages, except those bound with IMMEDWRITE(YES), and indicates that the write is to occur at or before Phase 1 Commit. Note that IMMEDWRITE(YES) is used for those plans and packages bound with that option.

The cache coherency system 124 writes data to one or more shared data storage devices or structures, such as a group buffer pool, DASD for GBPCACHE NO, group buffer pools for GBPCACHE NONE, or GBPCACHE SYSTEM page sets.

The subsystem parameter IMMEDWRI can override the value of the IMMEDWRITE bind option with which a plan or package is executed on a data sharing member and is set at a system level.

In the following example, two DBMS images, DB2A and DB2B, share data and Transaction-1, running on DB2A, updates a page in its local buffer pool and spawns Transaction-2, running on DB2B. That is, Transaction-1 makes an update to page P1 in DB2A's local buffer pool. Transaction-2 is dependent on the update to P1 that was made by Transaction-1. If the IW option were specified at DB2A, when Transaction-1 updates page P1, the cache coherency system 124 would ensure that DB2A immediately writes the page P1 to the shared data storage device (e.g., a coupling facility). Then, the coupling facility would transmit local buffer pool invalidation signals so that DB2B's local copy of page P1 is invalidated.

Then, control is returned back to Transaction-1's application logic, which schedules the "spawned dependent transaction," Transaction-2, which runs on DB2B. Transaction-2 then accesses page P1 in DB2B's local buffer pool, sees that page P1 is invalidated, and refreshes page P1 from the shared data storage device, and finds the qualifying row from Transaction-1 on the page P1.

The following are conventional alternatives to solving the order-dependent transaction problem:

Ensure that the originating transaction does not schedule the dependent transaction until the originating transaction has completed phase 2 of commit.

Run the dependent transaction with an isolation level of repeatable read.

Add statement retry logic to handle the return of a "row not found" condition.

Run the dependent transaction on the same member as the originating transaction.

Furthermore, in an alternative embodiment, the DBMS implements a "dynamic recognition of inter-system R/W sharing", as DB2® does. The dynamic recognition of inter-system R/W (read/write) sharing identifies datasets that have inter-system R/W interest. In this case, the cache coherency system 124 causes immediate writes only for those datasets that have inter-system R/W interest. This is advantageous as it improves the performance impact of the IW option.

On-line transaction processing (OLTP) applications are programs that are used for data entry and retrieval. A request for data is a transaction, and the computer responds immediately to user requests (e.g., an automatic teller machine or ATM). For most on-line transaction processing (OLTP) applications, the IW option is advantageous if there is shared electronic storage (SES) configured. This is because the immediate writes to disk would impose a server performance degradation. Immediate write means that the DBMS writes the page to external storage as soon as the physical update to the page is complete. Thus, the page is written to a shared data storage device before control is returned back to the application that requested the update.

In summary, conventional techniques for avoiding the problem of a spawned Transaction-2 using stale data require applications to monitor Transaction-1 and Transaction-2 and to implement locking, which adds considerable overhead. The IW option is advantageous in that it solves the problem without introducing the heavy overheads of having to lock the page ahead of time in order to check for qualifying rows.

Figure 3A:
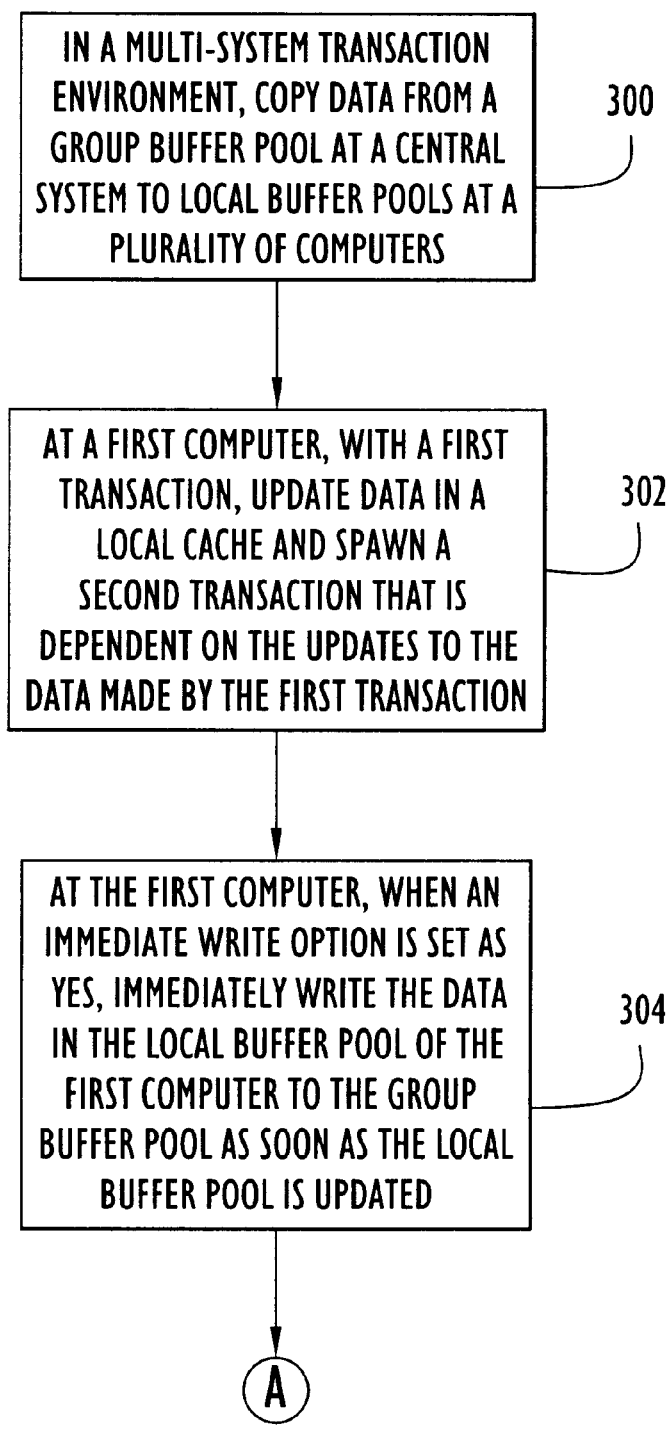
FIGS. 3A and 3B are flow diagrams that illustrate the process of a cache coherency system.
Figure 3B:
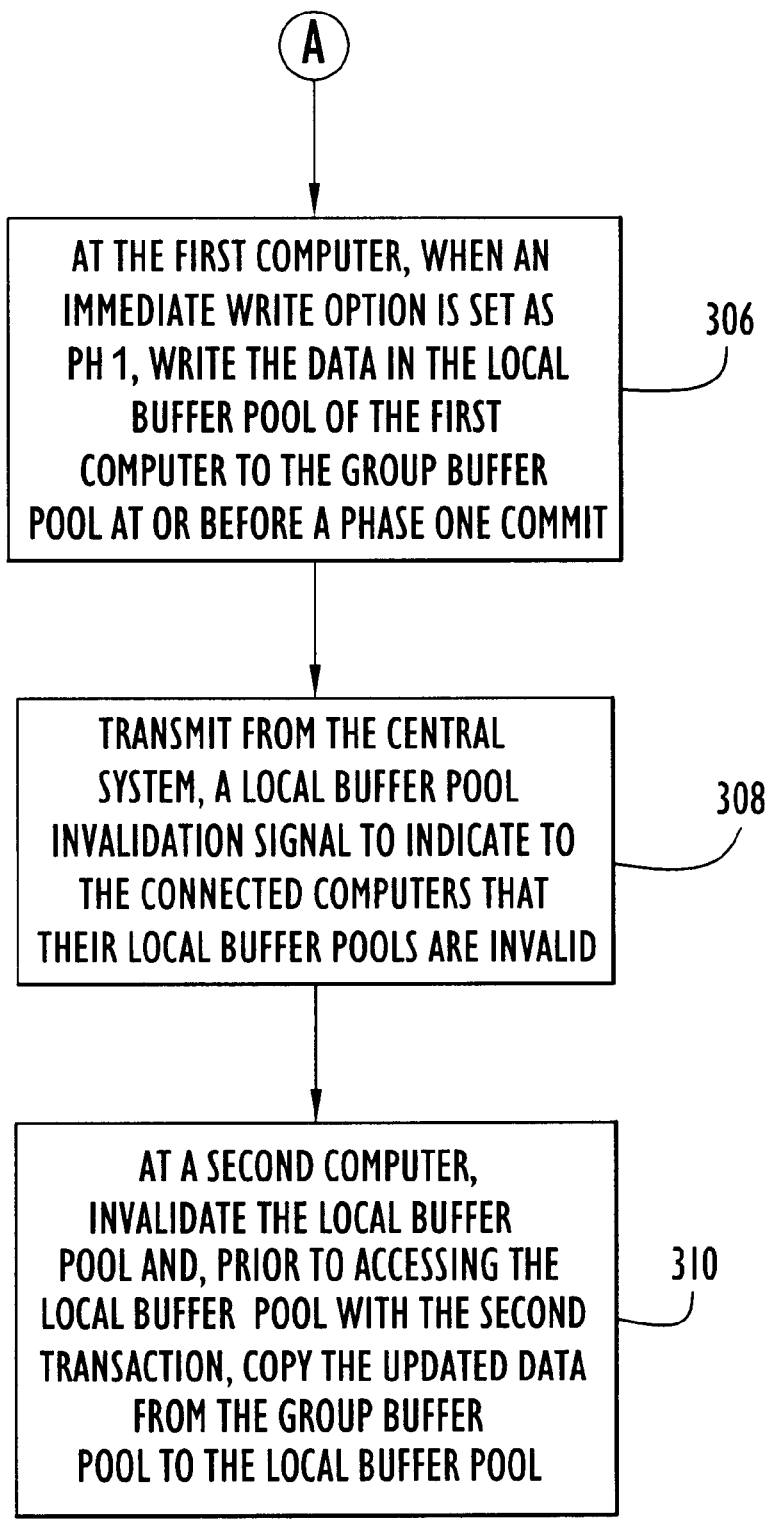

FIGS. 3A and 3B are flow diagrams that illustrate the process of the cache coherency system. In block 300 (FIG. 3A), in a multi-system transaction environment, data is copied from a group buffer pool at a central system to local buffer pools at multiple computers. In block 302, at a first computer, with a first transaction, data in a local cache is updated and a second transaction that is dependent on the updates to the data made by the first transaction is spawned. In block 304, at the first computer, when an immediate write option is set as YES, the data in the local buffer pool of the first computer is immediately written to the group buffer pool as soon as the local buffer pool is updated. In block 306 (FIG. 3B), at the first computer, when an immediate write option is set as PH1, the data in the local buffer pool of the first computer is written to the group buffer pool at or before a phase one commit. In block 308, from the central system, a local buffer pool invalidating signal is transmitted to the connected computers to indicate that their local buffer pools are invalid. In block 310, at a second computer, the local buffer pool is invalidated, and, prior to accessing the local buffer pool with the second transaction, the updated data is copied from the group buffer pool to the local buffer pool.

Conclusion

This concludes the description of one embodiment of the invention. The following describes some alternative embodiments for accomplishing the present invention. For example, any type of computer, such as a mainframe, minicomputer, or personal computer, or computer configuration, such as the Internet, a local area network, or wide area network, could be used with the present invention.

The foregoing description of one embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of ensuring cache coherency in a database containing data stored on a data storage device connected to a plurality of computers including a computer having a group buffer pool, the method comprising:

at a first computer, with a first transaction, updating data in a local buffer pool; and when an immediate write option is set, immediately writing the data in the local buffer pool of the first computer to the group buffer pool.

2. The method of claim 1, further comprising transmitting a local buffer pool invalidation signal to each local buffer pool that is sharing the data in the group buffer pool.

3. The method of claim 1, wherein the immediate write option is a subsystem parameter that is set at a system level.

4. The method of claim 1, wherein the immediate write option is a bind option that is set at a plan level.

5. The method of claim 1, wherein the immediate write option is set so that data is written to the group buffer pool as soon as the local buffer pool is updated.

6. The method of claim 1, further comprising spawning a second transaction at a second computer.

7. The method of claim 6, further comprising, at the second computer:
   receiving a local buffer pool invalidation signal;
   invalidating a local buffer pool of the second computer; and
   prior to accessing the local buffer pool of the second computer, copying updated data from the group buffer pool to the local buffer pool of the second computer.

8. The method of claim 6, wherein the immediate write option is set so that data is written to the group buffer pool at or before a phase one commit of the first transaction and prior to the spawning of the second transaction.

9. The method of claim 6, wherein the second transaction is dependent on updates to the data that were made by the first transaction.

10. An apparatus for ensuring cache coherency in a computing system having a plurality of computers connected together including a computer having a group buffer pool, the computers being connected to a data storage system that stores a database containing data, the apparatus being part of a first computer among the plurality of computers having a local buffer pool and a controller unit, the apparatus comprising:
   a storage device containing one or more computer programs suitable for execution by the controller unit for performing the operations of:
      with a first transaction, updating data in the local buffer pool; and
      when an immediate write option is set, immediately writing the data in the local buffer pool of the first computer to the group buffer pool.

11. The apparatus of claim 10, wherein said controller unit is configured to execute said one or more computer programs to transmit a local buffer pool invalidation signal to each local buffer pool that is sharing the data in the group buffer pool.

12. The apparatus of claim 10, wherein the immediate write option is set so that data is written to the group buffer pool as soon as the local buffer pool is updated.

13. The apparatus of claim 10, wherein the immediate write option is set so that data is written to the group buffer pool at or before a phase one commit of the first transaction.

14. The apparatus of claim 10, wherein said first computer spawns a second transaction at a second computer.

15. The apparatus of claim 14, wherein said controller unit is configured to further execute said one or more computer programs to transmit a local buffer pool invalidation signal to a second computer having a local buffer pool to invalidate the local buffer pool of the second computer, and cause the second computer, prior to accessing the second computer's local buffer pool with the second transaction, to copy updated data from the group buffer pool to the second computer's local buffer pool.

16. The apparatus of claim 14, wherein the second transaction is dependent on updates to the data that were made by the first transaction.

17. An article of manufacture comprising a computer program carrier readable by a computer and embodying one or more instructions executable by the computer for ensuring cache coherency in a database containing data stored in a data storage system connected to a plurality of computers including a computer having a group buffer pool, said article of manufacture comprising:
   program instructions for generating a first transaction for updating data in a local buffer pool of the first computer; and
   program instructions for immediately writing the data in the local buffer pool of the first computer to the group buffer pool, when an immediate write option is set.

18. The article of manufacture of claim 17, further comprising program instructions for transmitting a local buffer pool invalidation signal to each local buffer pool that is sharing the data in the group buffer pool.

19. The article of manufacture of claim 17, wherein the immediate write option is set so that data is written to the group buffer pool as soon as the local buffer pool is updated.

20. The article of manufacture of claim 17, wherein the immediate write option is set so that data is written to the group buffer pool at or before a phase one commit of the first transaction.

21. The article of manufacture of claim 17, further comprising program instructions for spawning a second transaction at a second computer.

22. The article of manufacture of claim 21, further comprising program instructions for transmitting a local buffer pool invalidation signal to a second computer having a local buffer pool for invalidating the local buffer pool of the second computer, and prior to accessing the local buffer pool of the second computer with the second transaction, copying updated data from the group buffer pool to the local buffer pool of the second computer.

23. The article of manufacture of claim 21, wherein the second transaction is dependent on updates to the data that were made by the first transaction.

24. A method of ensuring cache coherency in a shared database containing data stored on a data storage device, the data contained in the shared database being shared by a plurality of computers, the method comprising:
   writing updated data in a first local buffer pool, wherein the updated data is updated with a first transaction; and
   immediately writing the updated data in the first local buffer pool to a group buffer in the data storage device in response to updating the data in the first local buffer pool.

25. The method of claim 24, wherein the updated data in the first local buffer pool is written to the group buffer prior to spawning a second transaction that uses data in a second local buffer pool.

26. The method of claim 25, further comprising transmitting a local buffer pool invalidation signal to the second local buffer pool prior to spawning the second transaction.

27. The method of claim 25, further comprising:
   receiving a local buffer pool invalidation signal;
   invalidating the data in the second local buffer pool; and
   prior to spawning the second transaction, copying the updated data from the group buffer to the second local buffer pool.

28. The method of claim 24, wherein said immediate writing is performed if an immediate write option is set.

29. The method of claim 28, wherein the immediate write option is a subsystem parameter that is set at a system level.

30. The method of claim 28, wherein the immediate write option is a bind option that is set at a plan level.

31. The method of claim 28, wherein the immediate write option is set causing the updated data to be written to the group buffer when the updated data is written to the first local buffer pool.

32. The method of claim 28, wherein the immediate write option is set causing the updated data to be written to the group buffer at or before a phase one commit of the first transaction and prior to spawning a second transaction.

33. The method of claim 32, wherein the second transaction is dependent on the data updated by the first transaction.

34. An apparatus for ensuring cache coherency in a database computing system having a plurality of computers coupled together wherein at least one of said plurality of computers executes application logic, the apparatus being part of a first computer among the plurality of computers and comprising:

a local buffer pool; and a cache coherency unit coupled to the local buffer pool controlled according to an immediate write option and, if the immediate write option is set, configured to control a database to immediately write to a group buffer pool data within the local buffer pool modified by a first transaction issued by the application logic, prior to returning control to the application logic.

35. The apparatus of claim 34, wherein the cache coherency unit is further configured to control the database to write the modified data to the group buffer pool prior to the application logic spawning a second transaction that relies upon the modified data.

36. The apparatus of claim 34, wherein the cache coherency unit is configured to output a local buffer invalidation signal to one or more of the plurality of computers prior to the database returning control to the application logic.

37. The apparatus of claim 34, wherein the cache coherency unit is configured to output a local buffer invalidation signal to one or more of the plurality of computers prior to the first transaction spawning a second transaction that relies upon the modified data.

38. The apparatus of claim 34, wherein if the immediate write option is set the modified data is written to the group buffer pool as soon as the data in the local buffer pool is modified.

39. The apparatus of claim 34, wherein if the immediate write option is set the modified data is written to the group buffer pool at or before a phase one commit of the first transaction.

* * * * *